United States Patent
Luo et al.

(10) Patent No.: US 12,418,634 B2
(45) Date of Patent: Sep. 16, 2025

(54) REAL-TIME ADAPTIVE CORRECTION IN VIEWPORT PREDICTION FOR IMPROVED IMMERSIVE VIDEO

(71) Applicant: Intel Corporation, Santa Clara, CA (US)

(72) Inventors: Ying Luo, Shanghai (CN); Hua Zhang, Shanghai (CN); Xiaomin Chen, Shanghai (CN); Xin Kang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 18/275,596

(22) PCT Filed: Mar. 18, 2021

(86) PCT No.: PCT/CN2021/081460
§ 371 (c)(1),
(2) Date: Aug. 2, 2023

(87) PCT Pub. No.: WO2022/193211
PCT Pub. Date: Sep. 22, 2022

(65) Prior Publication Data
US 2024/0244172 A1    Jul. 18, 2024

(51) Int. Cl.
*H04N 13/117* (2018.01)
*H04N 13/194* (2018.01)
(Continued)

(52) U.S. Cl.
CPC ......... *H04N 13/117* (2018.05); *H04N 13/194* (2018.05); *H04N 13/332* (2018.05); *H04N 13/366* (2018.05); *H04N 21/816* (2013.01)

(58) Field of Classification Search
CPC .. H04N 13/117; H04N 13/194; H04N 13/332; H04N 13/366; H04N 21/816; H04N 13/344; H04N 13/383
See application file for complete search history.

(56) References Cited

U.S. PATENT DOCUMENTS

| | | | |
|---|---|---|---|
| 10,620,441 | B2 | 4/2020 | Van Der Auwera et al. |
| 2020/0374506 | A1 | 11/2020 | Petrangeli et al. |
| 2021/0243418 | A1 | 8/2021 | Ojala |

FOREIGN PATENT DOCUMENTS

| | | |
|---|---|---|
| CN | 110248178 | 9/2019 |
| CN | 110674925 | 1/2020 |
| CN | 112262583 | 1/2021 |

OTHER PUBLICATIONS

Hochreiter 1997 (Year: 1997).*
(Continued)

*Primary Examiner* — Shadan E Haghani
(74) *Attorney, Agent, or Firm* — Hanley, Flight & Zimmerman, LLC

(57) ABSTRACT

Techniques related to viewport selection in immersive video contexts are discussed. Such techniques include generating multiple viewport predictions each for a future time interval and based on different prediction models, ranking the viewport predictions using error descriptors of the prediction models, selecting a viewport prediction for the future time intervals using the ranking, and correcting the selected viewport predictions using the error descriptors.

20 Claims, 8 Drawing Sheets

(51) Int. Cl.
  *H04N 13/332*  (2018.01)
  *H04N 13/366*  (2018.01)
  *H04N 21/81*  (2011.01)

(56) References Cited

OTHER PUBLICATIONS

Cho 2014 (Year: 2014).*
Xu, Gaze Prediction, 2018 (Year: 2018).*
Li, Long Term Field of View, 2019 (Year: 2019).*
Geert, Van der Auwera et al., "AHG8: TSP Evaluation With Viewport-Aware Quality Metric For 360 Video" Joint Video Exploration Team (JVET) ITU-T SG 16 WP 3 and SO/IEC JTC1/SC29/WG11, 5th Meeting, Geneva, CH, Jan. 20, 2017.
International Preliminary Report on Patentability from PCT/CN2021/081460 notified Sep. 28, 2023, 5 pgs.
International Search Report and Written Opinion for PCT Application No. PCT/CN2021/081460, dated Nov. 25, 2021.
Aykut, T., et al., "Realtime 3D 360-Degree Telepresence With Deep-Learning-Based Head-Motion Prediction", IEEE Journal on Emerging and Selected Topics in Circuits and Systems, vol. 9, No. 1, pp. 231-244, Mar. 2019, doi:10.1109/JETCAS.2019.2897220.
Feng, X., et al., "Exploring CNN-Based Viewport Prediction for Live Virtual Reality Streaming", 2019 IEEE International Conference on Artificial Intelligence and Virtual Reality (AIVR), San Diego, CA, USA, 2019, pp. 183-1833, doi: 10.1109/AIVR46125.2019.00038.
Feng, X., et al., "LiveDeep: Online Viewport Prediction for Live Virtual Reality Streaming Using Lifelong Deep Learning", 2020 IEEE Conference on Virtual Reality and 3D User Interfaces (VR); 9 pages; Dec. 31, 2020.
Yang, Q., et al., "Single and Sequential Viewports Prediction for 360-Degree Video Streaming", 2019 IEEE International Symposium on Circuits and Systems (ISCAS), Sapporo, Japan, 2019, pp. 1-5, doi: 10.1109/ISCAS.2019.8702654.

\* cited by examiner

REAL-TIME ADAPTIVE CORRECTION IN VIEWPORT PREDICTION FOR IMPROVED IMMERSIVE VIDEO

CLAIM OF PRIORITY

This Application is a National Stage Entry of, and claims priority to, PCT Patent Application No. PCT/CN2021/081460, filed on Mar. 18, 2021 and titled "REAL-TIME ADAPTIVE CORRECTION IN VIEWPORT PREDICTION FOR IMPROVED IMMERSIVE VIDEO," which is herein incorporated by reference in its entirety.

BACKGROUND

Recently, adoption of virtual reality (VR) and augmented reality (AR) has been of great interest in various fields such as entertainment, education, manufacturing, and others. To meet bandwidth and latency challenges in such VR, AR, and immersive video contexts, only the viewport of interest may be sent or pre-rendering may be performed at the edge in immersive video applications. Furthermore, tile based mixed resolution or bitrate streaming has been adopted in VR video delivery. In such contexts, when the user's viewport moves relatively quickly, there may be quality loss in the next FOV (field of view or viewport) region when the viewport, which negatively affects the immersive experience. To this end, the user viewport may be pre-fetched in advance by conducting viewport prediction. Assuming that the prediction algorithm is accurate, the user does not see any low-resolution content during viewing. Therefore, improving the accuracy of viewport prediction is of great importance in immersive experiences.

Currently, viewport prediction algorithms include those based on viewing trajectory or image content. For example, a single viewport prediction model may be based on trajectory using a convolutional neural network (CNN) and recurrent neural network (RNN) in sequential viewports using trajectory and content characteristics. Furthermore, head-motion prediction modeling may employ a deep neural network fed with a sequence of pan, tilt, and roll orientation values. Other techniques include predicting a viewport by modifying the workflow of a CNN application and the training/testing process of the CNN. However, such techniques have drawbacks including performance limitations that do not provide enough accuracy for practical deployment.

It is desirable to improve viewport prediction in VR, AR, immersive video and other contexts. It is with respect to these and other considerations that the present improvements have been needed. Such improvements may become critical as the desire to provide new and immersive user experiences becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
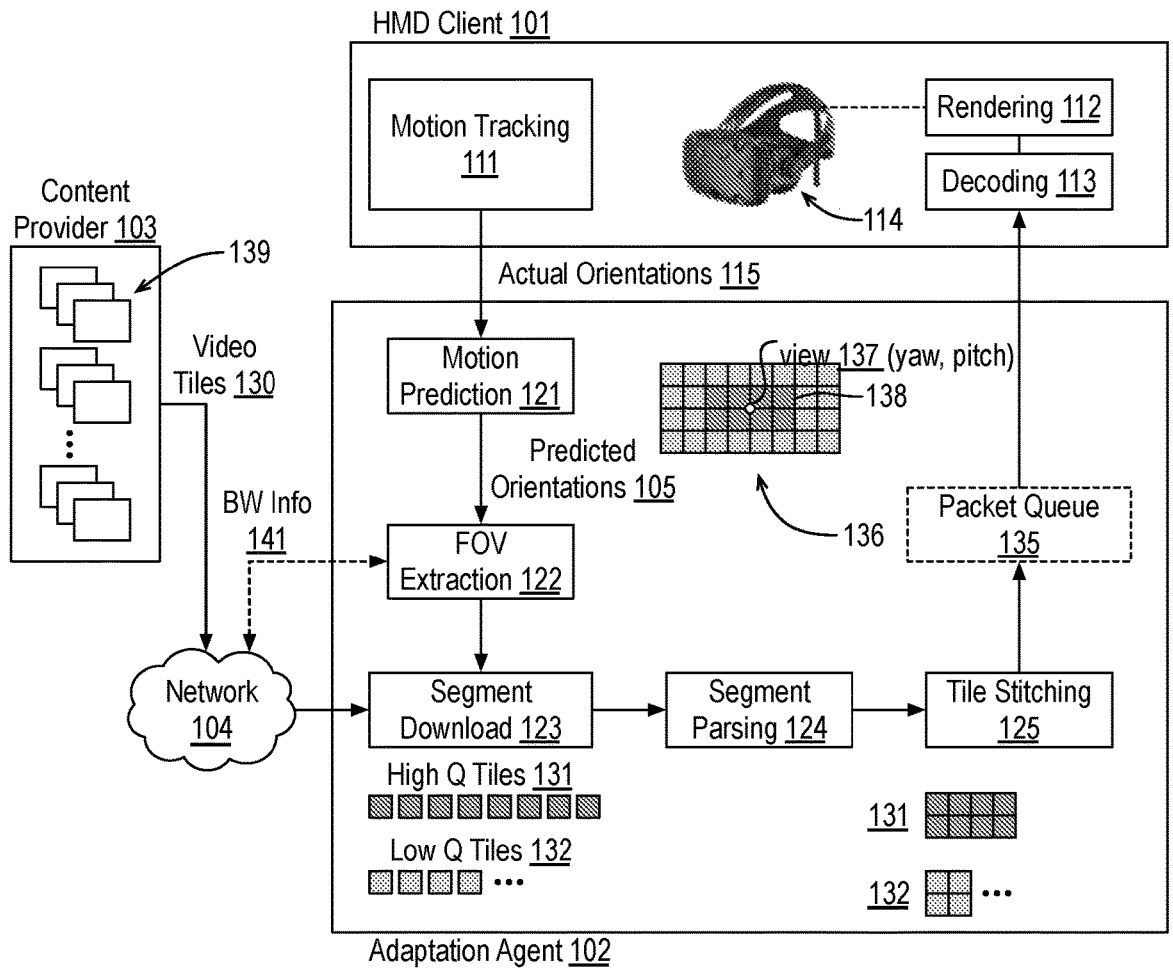
FIG. 1 illustrates an example system for providing immersive video including viewport prediction.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to viewport prediction in immersive video contexts.

As described above, it is desirable to predict a viewport in virtual reality (VR), augmented reality (AR), and immersive video contexts. As used herein, the term immersive video is used to broadly indicate any context where a user or users are being presented video based on the relative orientation between the user(s) and the scene being displayed. Such immersive video may be displayed in the contexts of gaming, a virtual reality experience, an augmented reality experience, or others. The video being displayed be fully immersive (e.g., the user only views the video) or the video may augment the view of the user. In such contexts, a viewport or virtual camera or virtual view is defined such that the user is located (e.g., by x, y, z coordinates or other systems) and oriented (e.g., by yaw, pitch, and roll or other systems) within a scene. The user is then presented the image information pertinent to the location and orientation (e.g., as if the user is actually within the scene).

In such contexts, both bandwidth and latency challenges may be met by predicting the future viewport(s) of the user and only downloading the video information (e.g., tiles) in higher quality for the view (e.g., tiles) directly adjacent to the view defined by the predicted viewport(s) and downloading the video information in lower quality for view (e.g., tiles) outside of the immediately adjacent area. For example, the user may focus more on the central portion of the view as defined by the viewport and such regions are then provided in higher quality while those at the periphery are provided in lower quality where corresponding artifacts are less likely to be noticed by or distract the user. Other advantages provided by accurate viewport prediction are available. Notably, the techniques discussed herein provide improved viewport predictions relative to actual motion to provide adjustments that improve performance (e.g., up to 15 to 20 degrees) that impact tile selection in immersive video. Furthermore, the adjustment techniques discussed herein advantageously provide improved performance even in the first 20 seconds of video during which the model used to provide baseline prediction are attaining additional training data.

The techniques discussed herein provide adaptive correction based on viewport trajectory and the error between predicted viewports and actual viewports in such trajectories. In such contexts, prediction error as determined using historical error descriptors is used to provide correction to the prediction results of the trained viewport prediction model. Furthermore, the discussed techniques employ strategies including multiple model ranking to provide more precise final viewport predictions. The viewport prediction model may employ any suitable viewport prediction model based on viewport trajectory and/or video content such as linear regression models, convolutional neural network (CNN) models, recurrent neural network (RNN) models, deep neural network (DNN) models, or others. Furthermore, such viewport prediction models may be pretrained and provide training on the fly as known in the art. Herein, such viewport prediction models are discussed with respect to linear regression models for the sake of clarity of presentation; however, any suitable model or model(s) may be employed.

FIG. 1 illustrates an example system 100 for providing immersive video including viewport prediction, arranged in accordance with at least some implementations of the present disclosure. System 100 may be implemented across any number of discrete devices in any suitable manner. In some embodiments, system 100 or another system includes numerous cameras pre-installed in a stadium, arena, event location, etc. to generate immersive video content 139 that may be stored by content provider 103 and ultimately viewed by a user. In some embodiments, immersive video content 139 may be computer generated content, gaming content, or any other suitable immersive video content in any suitable video format. System 100 also includes a immersive video adaption agent 102 (such as a virtual reality (VR) adaption agent) and a head mounted display (HMD) client 101 communicably coupled via a wired or wireless interface. In some embodiments, immersive video adaption agent 102 and HMD client are implemented via the same physical device. Although illustrated with respect to immersive video adaption agent 102 and HMD client 101, any suitable devices, displays, and the like may be employed. Notably, immersive video adaption agent 102 receives actual orientation 115 and generates predicted orientations 105 that are in turn used to retrieve portions of immersive video content 139 for display to a user wearing HMD 114.

Beginning with HMD client 101, HMD client 101 includes a motion tracking module 111, HMD 114, rendering module 112, and decoding module 113. HMD 114 is worn by a user to provide an immersive viewing experience. The physical package or device of HMD 114 also includes a processor, memory, a gyro, etc. to deploy motion tracking module 111, rendering module 112, and decoding module 113 as well as lenses, display optics, etc. to display immersive video to a user. Although illustrated with respect to a HMD headset, any immersive video display device may be used. HMD client 101 receives packet queues 135 and decodes and renders the corresponding video information for display to a user. HMD client 101 further tracks motion of the user to provide actual orientations 115. Actual orientations 115 provide the actual position and/or orientation of the user relative to a defined coordinate system at particular time instances. In some embodiments, the particular time instances correspond to presentation time stamps (PTS) such that at each frame presented to the user, the time of the frame and corresponding location and orientation of the user are provided as actual orientations 115. In some embodiments, a lower level of detail may be provided such that actual orientations 115 and their corresponding time stamps are provided, for example, every quarter of a second, every tenth of a second, or the like.

Thereby, HMD client 101 displays immersive video, as received from immersive video adaption agent 102, to a user and provides an actual trajectory of the user back to immersive video adaption agent 102. It is a goal of immersive video adaption agent 102 to generate predicted orientations 105 that successfully predict actual orientations 115. Techniques for accurately predicting future actual orientations are discussed further herein below. As shown, predicted orientations 105 are used by field of view extraction module 122, which requests and attains pertinent video tiles 130 (or other video data structures) using predicted orientations 105 and under bandwidth (BW) constraints as indicated by bandwidth information 141. For example, when bandwidth is high, more high quality video tiles at greater frequency may be attained and when bandwidth is low, lower frequency may be employed and/or fewer high quality tiles may be attained.

Such video tiles 130 are downloaded by a segment download module 123 and include high quality (Q) tiles 131 and low quality tiles 132. High quality tiles are indicated by a darker shading relative to low quality tiles. For example, high quality tiles 131 may have one or more of a higher bitrate, higher resolution, more color information relative to low quality tiles 132. As shown with respect to constructed view 136, it is desirable to have a center view 137 (as defined by a yaw and pitch of predicted orientations 105) entirely surrounded by high quality tiles 131 that are immediately adjacent center view 137 while the periphery of the view is made up of low quality tiles 132. As used herein, the term center view indicates the center location of the view provided to a user based on the pertinent viewport as defined by the locations and orientations discussed herein. As such, when properly predicted, a center region 138 includes only high quality tiles 131. It is noted that if center view 137 were not at the center of constructed view 136 (e.g., the predicted orientations were wrong such that the user is not aligned with center view 137), the user will, within the center region, view low quality tiles. Therefore, it is critical that center view 137 matches the predicted center view.

As shown, processing continues via a segment parsing module 124 and a tile stitching module 125, which segments and stiches high quality tiles 131 and low quality tiles 132 to provide packet queue 135, including a representation of constructed view 136 and, optionally, other regions as covered by low quality tiles. Packet queue 135 may be any suitable data structure such as packetized compressed video data for decoding and rendering by HMD client 101. HMD client 101 receives packet queue 135 and decodes the video data via decoding module 113 and renders immersive video for display to a user wearing HMD 114 via rendering module 112. For example, rendering module 112 may render a view based on an actual orientation of the user in the virtual space, which may be rendered in higher quality when the orientation predicted by predicted orientations 105 matches the actual orientation of HMD 114 in the virtual space.

For example, system 100 provides an architecture for tile based streaming in an immersive video system such as a VR system. Immersive video content 136 is stored in (and optionally generated by) content provider 103, which is accessible via network 104 or other communications channel by immersive video adaption agent 102. In HMD 114, head movement of a user is traced with current viewport positions and PTSs sent to immersive video adaption agent 102 via actual orientations 115 at time intervals. Immersive video adaption agent 102 timely selects particular tiles in the field of view (FOV) as predicted by motion prediction module 121 and download the corresponding segments. Subsequently, the downloaded segments are parsed and stitched using high and low quality tiles separately. HMD client 101 receives packet queue 135 and completes decoding and rendering operations to ultimately display immersive video to the user of HMD client 101. As discussed further below, the techniques discussed herein include FOV sequence prediction to generate predicted orientations 105. When the user views the resultant immersive video, the FOV will be in high quality when the prediction is accurate and, therefore, improving the accuracy of the viewport prediction model is important to the viewing experience.

Figure 2:
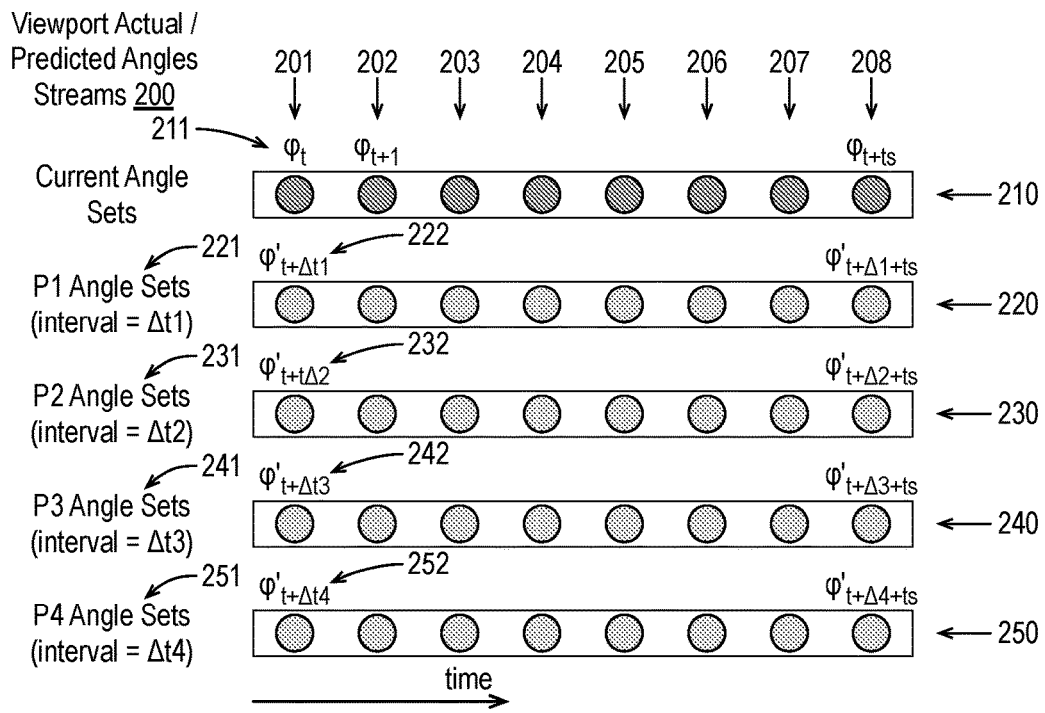
FIG. 2 illustrates example actual and predicted viewport angle set streams.

FIG. 2 illustrates example actual and predicted viewport angle set streams 200, arranged in accordance with at least some implementations of the present disclosure. As shown, at each or some of a number of time instances, 201, 202, 203, 204, 205, 206, 207, 208, and so on, actual angle sets 210 are received from HMD client 101, including actual angle set 211 for time instance 201. As used herein, the term angle set indicates a number of angles and/or other data that indicate and define a viewport in immersive video. In some embodiments, an angle set includes a yaw (i.e., an angle about a vertical or z axis) and a pitch (i.e., angle about horizontal or y axis). Such angles define a viewport within immersive video. The viewport may also be influenced by position within the coordinate system or other data. At each time instance 201-208, a current angle set, $\varphi_t, \varphi_{t+1}, \ldots \varphi_{t+ts}$, indicates the actual angle set of the user of HMD client 101 at that time instance.

Also as shown, for each of time instances 201-208, a number of prediction models 221, 231, 241, 251 are employed to make angle set predictions (i.e., orientation or trajectory predictions) for different future time intervals from time instances 201-208. In the illustrated example, a first prediction model (P1) 221 makes predictions for a time interval of the future by $\Delta t1$, a second prediction model (P2) 231 makes predictions for a time interval of the future by $\Delta t2$, a third prediction model (P3) 241 makes predictions for a time interval of the future by $\Delta t3$, and a fourth prediction model (P4) 251 makes predictions for a time interval of the future by $\Delta t4$ such that $\Delta t4 > \Delta t3 > \Delta t2 > \Delta t1$. In some embodiments, $\Delta t1$ is 0.25 seconds, $\Delta t2$ is 0.5 seconds, $\Delta t3$ is 0.75 seconds, and $\Delta t4$ is 1.0 seconds; however any suitable time instances may be used.

Furthermore, although illustrated with respect to four prediction models, which provides a desirable balance between complexity and accuracy any number of prediction models may be used. In some embodiments, two prediction models are used. In some embodiments, three prediction models are used. In some embodiments, five or more prediction models. In some embodiments, a single prediction model is employed and the error evaluation and prediction model ranking discussed below are bypassed. Prediction models 221, 231, 241, 251 may employ any suitable viewport trajectory prediction models. In some embodiments, one or more of prediction models 221, 231, 241, 251 include linear regression models. In some embodiments, one or more of prediction models 221, 231, 241, 251 include CNN models. In some embodiments, one or more of prediction models 221, 231, 241, 251 include RNN models. In some embodiments, one or more of prediction models 221, 231, 241, 251 include DNN models. Prediction models 221, 231, 241, 251 may all include the same type of models (using different training inputs and/or parameters) or they may include models of different types. In some embodiments, each of prediction models 221, 231, 241, 251 employs a linear regression model. Furthermore, prediction models 221, 231, 241, 251 may be pretrained and/or they may be taught on the fly using techniques known in the art.

As shown, prediction model 221 generates a predicted sets of angles stream 220 with a viewport angle prediction set 222 from each of time instances 201-208 plus Δt1 (i.e., predicted angle sets $\varphi'_{t+\Delta t1}$, $\varphi'_{t+\Delta t1+1}$, ... $\varphi'_{t+\Delta t1+ts}$), prediction model 231 generates a predicted sets of angles stream 230 with viewport angle prediction set 232 from each of time instances 201-208 plus Δt2 (i.e., predicted angle sets $\varphi'_{t+\Delta t2}$, $\varphi'_{t+\Delta t2+1}$, ... $\varphi'_{t+\Delta t2+ts}$), prediction model 241 generates a predicted sets of angles stream 240 with a viewport angle prediction set 242 from each of time instances 201-208 plus Δt3 (i.e., predicted angle sets $\varphi'_{t+\Delta t3}$, $\varphi'_{t+\Delta t3+1}$, ... $\varphi'_{t+\Delta t3+ts}$), and prediction model 251 generates a predicted sets of angles stream 250 with a viewport angle prediction set 252 from each of time instances 201-208 plus Δt4 (i.e., predicted angle sets $\varphi'_{t+\Delta t4}$, $\varphi'_{t+\Delta t4+1}$, ... $\varphi'_{t+\Delta t4+ts}$). In the illustrated embodiment, four intervals (Δt1, Δt2, Δt3, Δt4) are adopted, one for each of prediction models 221, 231, 241, 251. More or fewer time intervals may be used. As used herein, the term viewport angle prediction set indicates a set of angles by which a predicted viewport may be attained.

In some embodiments, given the previous actual viewport stream $\varphi_{t-tj}$, $\varphi_{t-tj+1}$, ... $\varphi_t$, the predicted angles $\varphi'_{t+\Delta ti}$ are determined as shown in Equation (1):

$$\varphi'_{t+\Delta ti} = f(\varphi_{t-tj}, \varphi_{t-tj+1}, \ldots, \varphi_t), i = 1, 2, 3, 4 \quad (1)$$

where $\varphi'_{t+\Delta ti}$ are the predicted angle sets for each of i prediction models and corresponding intervals, Δti, and f provides the prediction model function (e.g., a linear regression model).

Actual and predicted viewport angle set streams 200 thereby provides, for each of time instances 201-208, an actual angle set (as measured and provided from HMD client 101) and multiple predicted future angle sets, one each for a number of different time intervals. Thereby, multiple viewport angle prediction sets each for a different future time interval from a current time and each based on a different prediction model are generated.

Figure 3:
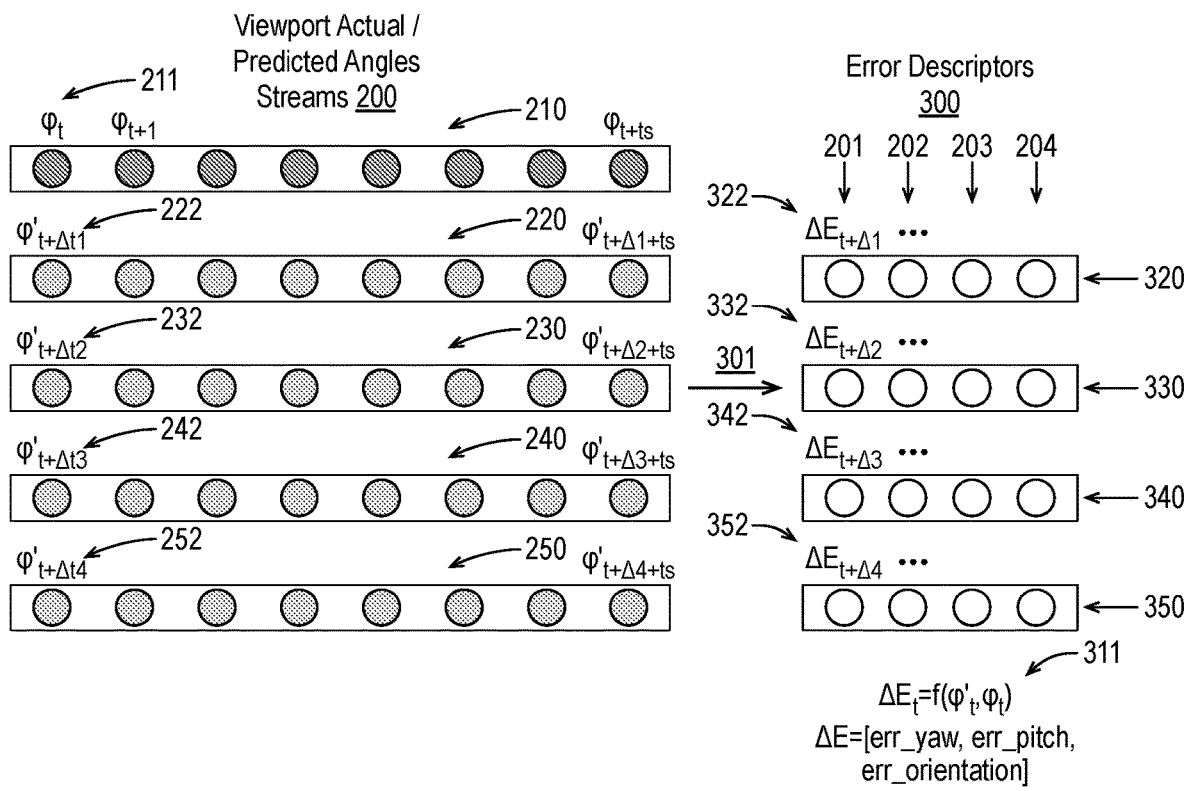
FIG. 3 illustrates example error descriptors determined using actual and predicted viewport angle set streams.

FIG. 3 illustrates example error descriptors 300 determined using actual and predicted viewport angle set streams 200, arranged in accordance with at least some implementations of the present disclosure. As shown, for each of predicted sets of angles stream 220, 230, 240, 250, as generated by prediction models 221, 231, 241, 251, respectively, corresponding error descriptors 320, 330, 340, 350, respectively, are determined using error evaluation operation 301. For example, for predicted sets of angles stream 220 at time instance 201, an error descriptor 322 of error descriptors 320, $\Delta E_{t+\Delta t1}$, is determined as a error in yaw, an error in pitch, and an orientation between viewport angle prediction set 222 (e.g., predicted angles) and an actual angle set (e.g., actual angles). In some embodiments, the actual angle set is at the timestamp corresponding to the viewport angle prediction set. For example, the error may be between viewport angle prediction set 222 at time t+Δt1 and an actual angle set taken at time t+Δt1 (not shown). In some embodiments, the actual angle set is at a closest available timestamp corresponding to the viewport angle prediction set. In some embodiments, the actual angle set is at the timestamp from which the prediction was made (i.e., at time t). As shown, for each available predicted set of angles, a corresponding error descriptor 320 may also be attained. Such error descriptors 320 may be attained at each such time instance or a lower frequency may be used. Other error descriptors of error descriptors 320 are determined in the same or similar manner.

As discussed, each error descriptor such as error descriptor 322 indicates a difference between the actual and predicted angles and an orientation of the error. In some embodiments, the error is an absolute value of the difference between the actual and predicted angles (e.g., absolute value difference between predicted yaw and actual yaw, absolute value difference between predicted pitch and actual pitch, etc.) and the orientation of the error indicates the orientation using one of eight orientations: above, below, left, right, above and right, above and left, below and right, and below and left. Other orientation indicators may be used.

As with error descriptors 320 as determined for predicted sets of angles stream 220, error descriptors 330 are determined for predicted sets of angles stream 230, error descriptors 340 are determined for predicted sets of angles stream 240, and error descriptors 350 are determined for predicted sets of angles stream 250. For example, an error descriptor 332, $\Delta E_{t+\Delta t2}$, of error descriptors 330 for predicted sets of angles stream 230 at time instance 201, is determined as a error in yaw, an error in pitch, and an orientation of the errors between viewport angle prediction set 232 and an actual angle set. Similarly, an error descriptor 342, $\Delta E_{t+\Delta t3}$, of error descriptors 340 for predicted sets of angles stream 240 at time instance 201, is determined as a error in yaw, an error in pitch, and an orientation of the errors between viewport angle prediction set 242 and an actual angle set. Finally, an error descriptor 352, $\Delta E_{t+\Delta t4}$, of error descriptors 350 for predicted sets of angles stream 250 at time instance 201, is determined as a error in yaw, an error in pitch, and an orientation of the errors between viewport angle prediction set 252 and an actual angle set. Error descriptors at other time instances 202-208 and so on, as well as error descriptors for other prediction models (if employed) are determined in the same or similar manner.

For example, error evaluation operation 301 may be deployed as shown with respect to error evaluation 311 where, for each of prediction models 221, 231, 241, 251 and at each time instance, an error descriptor, $\Delta E_t = f(\varphi'_t, \varphi_t)$ is defined where f provides a function to determine the error between a predicted angle set, $\varphi'_t$, and an actual angle set, $\varphi_t$, at a time t such that the error descriptor has a data set defined as ΔE=[err_yaw, err_pitch, err_orientation) where err_yaw is the difference in yaw between the actual and predicted angle sets, err_pitch is the difference in pitch between the actual and predicted angle sets, and err_orientation describes the orientation of the error between the actual and predicted angle sets. Thereby, an error descriptor is determined for each of prediction models 221, 231, 241, 251 using predicted and real-time measured viewport angle sets. Such error descriptors may be used to select and correct viewport angle prediction sets for system 100.

Figure 4:
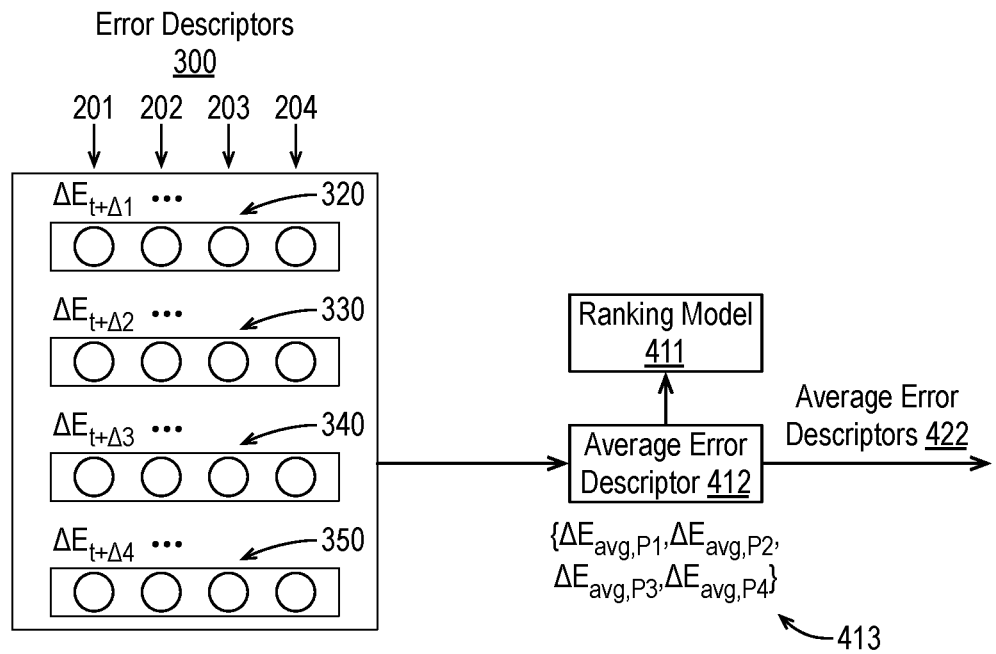
FIG. 4 illustrates example generation of average error descriptors and application of a ranking model using the determined using error descriptors.

FIG. 4 illustrates example generation of average error descriptors and application of a ranking model using the determined using error descriptors 300, arranged in accordance with at least some implementations of the present disclosure. As shown, using error descriptors 300, an average error descriptor is generated for each of prediction models 221, 231, 241, 251 by average error descriptor module 412 and as aggregated into average error descriptors 422. Average error descriptors 422 are then used via ranking model 411 to rank available ones of prediction models 221, 231, 241, 251 as discussed further below.

The average error descriptor for each of prediction models 221, 231, 241, 251 may be generated using any suitable technique or techniques. In some embodiments, the average error descriptor is the average of a particular number of most recent error descriptors. For example, a moving window of 100 most recent error descriptors may be used to generate each error descriptor for prediction models 221, 231, 241, 251. For example, each average error descriptor of average error descriptors may be determined as shown with respect to average error evaluation 413 where, for each of prediction models 221, 231, 241, 251 and at each time instance or some time instances, an average error descriptor, $\Delta E_{avg,Pi}$, one for each of i prediction models is generated and provided as a set of average error descriptors 422. Such average error descriptors 422 are also provided to ranking model module 411.

Figure 5:
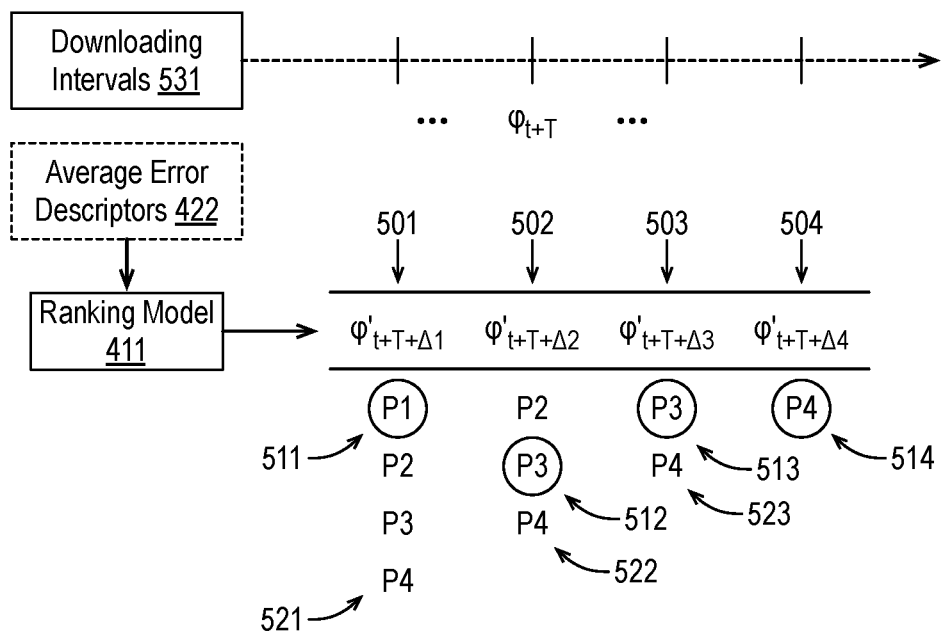
FIG. 5 illustrates example ranking of prediction models for different future time intervals.

FIG. 5 illustrates example ranking of prediction models 221, 231, 241, 251 for different future time intervals, arranged in accordance with at least some implementations of the present disclosure. As shown, using average error descriptors 422 (i.e., an average error descriptor for each of prediction models 221, 231, 241, 251), ranking model module 411 ranks available ones of prediction models 221, 231, 241, 251 at each time interval from a particular time. As used herein, the term particular time indicates any time from which future predictions are to be made. Such a particular time may be characterized as a current time, a preselected time, a predefined time, or the like. For example, for defined downloading intervals 531, particular times are provided from which different future time interval predictions are made to predict a trajectory using selected viewport angle prediction sets. For example, for a current, particular, predefined, download time (e.g., a time when a current download is occurring), or the like, given as t+T, prediction data (e.g., predicted sets of angles) are selected at times t+T+$\Delta$ti (i=1, 2, 3, 4). For example, prediction at time t+T+$\Delta$t1 501 is made by prediction model 221, prediction at time t+T+$\Delta$t2 502 is made by prediction model 231, prediction at time t+T+$\Delta$t3 503 is made by prediction model 241, and prediction at time t+T+$\Delta$t4 504 is made by prediction model 251.

Notably, at time t+T+$\Delta$t1 501 any of the available prediction models 221, 231, 241, 251 may be used to predict the angle set. At time t+T+$\Delta$t1 501, set of prediction models 521 inclusive of all prediction models 221, 231, 241, 251 are evaluated and ranked according to their average error descriptors with the model having the lowest average error descriptor ranking highest, the model having the second lowest average error descriptor ranking second highest, and so on. In the example of FIG. 5, at time t+T+$\Delta$t1 501, prediction model 221 (P1) is the best ranked (i.e., lowest error) model as indicated by selection circle 511. The average error descriptors may be ranked using any suitable technique or techniques. In some embodiments, a sum of the yaw error and the pitch error is used to rank the average error descriptors. In some embodiments, a sum of squares of the yaw error and the pitch error is used to rank the average error descriptors.

At subsequent times, prediction models having a prediction time interval shorter than the desired time interval are aged out of being used. For example, at time t+T+$\Delta$t2 502, only prediction models 231, 241, 251 are evaluated as part of set of prediction models 522 and ranked without use of prediction model 221. At time t+T+$\Delta$t2 502, prediction model 221 is no longer used due to the prediction time interval ($\Delta$t1) of prediction model 221 being less than the desired time interval ($\Delta$t1<$\Delta$t2). Similarly, at time t+T+$\Delta$t3 503, only prediction models 241, 251 are evaluated and ranked as part of set of prediction models 523 without use of prediction models 221, 231. At time t+T+$\Delta$t3 503, prediction models 221, 231 are no longer used due to the prediction time intervals ($\Delta$t1, $\Delta$t2) of prediction models 221, 231 being less than the desired time interval ($\Delta$t1<$\Delta$t3, $\Delta$t2<$\Delta$t3). Finally, at time t+T+$\Delta$t4 504, only prediction model 251 is used and prediction models 221, 231, 241 are not evaluated. For example, at time t+T+$\Delta$t4 504, prediction models 221, 231, 241 are no longer used due to the prediction time intervals ($\Delta$t1, $\Delta$t2, $\Delta$t3) of prediction models 221, 231, 241 being less than the desired time interval ($\Delta$t1<$\Delta$t4, $\Delta$t2<$\Delta$t4, $\Delta$t3<$\Delta$t4).

Returning to time t+T+$\Delta$t2 502, at that time, prediction model 223 (P3) is the best ranked (i.e., lowest error) model as indicated by selection circle 512. Similarly, at time t+T+$\Delta$t3 503, at prediction model 223 (P3) is again the best ranked (i.e., lowest error) model as indicated by selection circle 513. Finally, at time t+T+$\Delta$t4 505, only prediction model 224 (P3) is available for use and it is selected as indicated by selection circle 514. Accordingly, at each future time interval, a viewport angle prediction set is selected (as indicated by $\varphi'_{t+T+\Delta t1}$, $\varphi'_{t+T+\Delta t2}$, $\varphi'_{t+T+\Delta t3}$, and $\varphi'_{t+T+\Delta t4}$). In the illustrated example, at the first time interval, the result from prediction model 221 is used, at the second and third time intervals, the result from prediction model 223 is used, and at the fourth time interval, the result from prediction model 224 is used. However, such usages are merely exemplary and any combination of prediction models may be selected in practice. Such selected results (e.g., viewport angle prediction sets) are then corrected using the average error descriptors to provide final viewport angle prediction sets.

Figure 6:
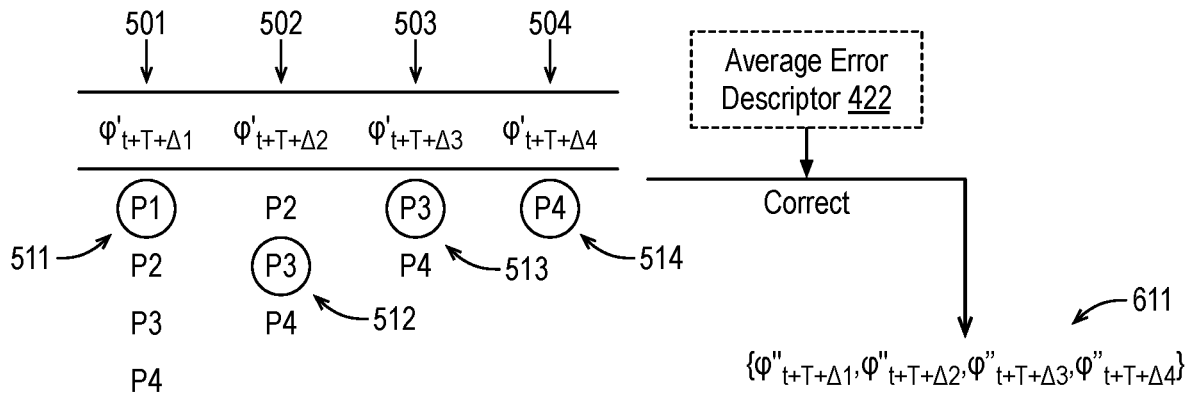
FIG. 6 illustrates example real-time correction of selected viewport angle prediction sets using average error descriptors.

FIG. 6 illustrates example real-time correction of selected viewport angle prediction sets using average error descriptors, arranged in accordance with at least some implementations of the present disclosure. As shown, for each future time interval, t+T+$\Delta$ti (i=1, 2, 3, 4), the selected viewport angle prediction sets (e.g., including at least a yaw angle and a pitch angle to define a viewport) are corrected using the average error descriptors generated as discussed with respect to FIG. 5. For example, the pertinent average error descriptor angle correction magnitudes may be added, in accordance with the orientation defined in the each of the average error descriptors to the selected viewport angle prediction sets to define corrected viewport angle prediction sets 611 including a corrected viewport angle prediction set for time t+T+$\Delta$t1 ($\varphi''_{t+T+\Delta t1}$), a corrected viewport angle prediction set for time t+T+$\Delta$t2 ($\varphi''_{t+T+\Delta t2}$), a corrected viewport angle prediction set for time t+T+$\Delta$t3 ($\varphi''_{t+T+\Delta t3}$), and a corrected viewport angle prediction set for time t+T+$\Delta$t4 ($\varphi''_{t+T+\Delta t4}$), as well as corrected viewport angle prediction sets for any other time intervals.

In the illustrated example, the corrected viewport angle prediction set $\varphi''_{t+T+\Delta t1}$ is a combination of viewport angle prediction set $\varphi'_{t+T+\Delta t1}$ as predicted by prediction model 221 and the average error descriptor for prediction model 221, $\Delta E_{avg,P1}$. As discussed, in some embodiments, the yaw error and pitch error of the average error descriptor for prediction model 221, $\Delta E_{avg,P1}$, are added to the yaw and pitch predictions of viewport angle prediction set $\varphi'_{t+T+\Delta t1}$ as predicted by prediction model 221 based on the error orientation of the average error descriptor for prediction model 221, ΔEavg,pi. The corrected viewport angle prediction sets $\varphi''_{t+T+\Delta t2}$, $\varphi''_{t+T+\Delta t3}$, and $\varphi''_{t+T+\Delta t4}$, are generated in a similar manner by correcting each with the average error descriptor, $\Delta E_{avg,Pj}$, corresponding to the prediction model, j, used to make the prediction for the particular future time interval. Thereby, the modeled viewport angle prediction sets are ranked and corrected in real time for improved viewport prediction performance.

Figure 7:
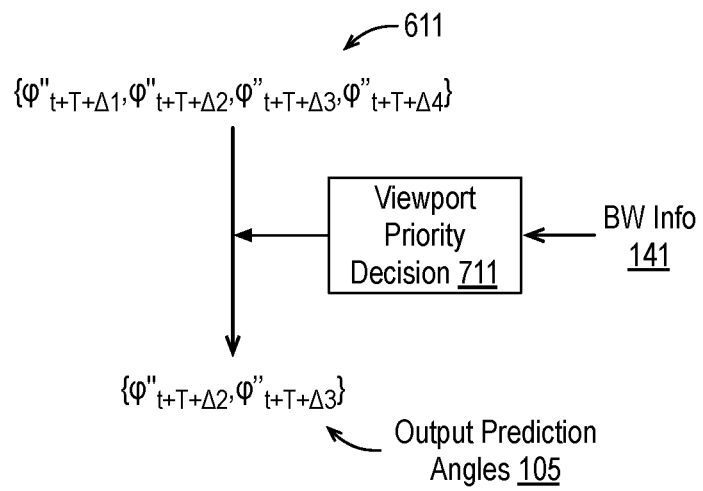
FIG. 7 illustrates example real-time adjustment of video segment downloads based on current bandwidth information.

FIG. 7 illustrates example real-time adjustment of video segment downloads based on current bandwidth information, arranged in accordance with at least some implementations of the present disclosure. In some embodiments, current bandwidth and other system constraints may not allow for immersive video adaption agent 102 to download and/or process video segments for each of corrected viewport angle prediction sets 611. As shown, bandwidth information 141 is received by viewport priority decision module 711, which may be implemented by field of view extraction module 122 for example. Bandwidth information 141 may include any suitable information such as current available communication bandwidth between immersive video adaption agent 102 and content provider 103 over network 104. Viewport priority decision module 711 evaluates bandwidth information 141 and/or system status of immersive video adaption agent 102 and determines whether or not all available video segments corresponding to corrected viewport angle prediction sets 611 can be accessed under current operational conditions.

For example, immersive video adaption agent 102 may compare a current bandwidth to one or more thresholds based on the bandwidth needed to download the video segments corresponding to corrected viewport angle prediction sets 611. If the current available bandwidth is greater than a threshold indicating all video segments corresponding to corrected viewport angle prediction sets 611 can be downloaded, immersive video adaption agent 102 may request and download all video segments corresponding to corrected viewport angle prediction sets 611. If the comparison indicates fewer video segments may be downloaded, immersive video adaption agent 102 may then request the pertinent number of video segments. A similar approach may be taken based on any other constraints to processing the video segments such as system capabilities of immersive video adaption agent 102, power reduction targets, etc.

In the illustrated example, bandwidth information 141 indicates two video segments may be downloaded and processed under current conditions. However, bandwidth information 141 may limit the download and processing to any number of video segments. As illustrated, in such contexts, the temporally middle video segments, corresponding to corrected viewport angle prediction sets at future time intervals t+T+Δt2 and t+T+Δt3 may be downloaded and processed due to providing the smoothest trajectory for the user. However, other future time intervals may be used. Notably, the corrected viewport angle prediction sets corresponding to future time intervals t+T+Δt1 and t+T+Δt4 are discarded to generate final predicted orientations 105, inclusive of the corrected viewport angle prediction sets for which video segments are to be downloaded and processed as discussed above. In other embodiments, such discarding is not needed and final predicted orientations 105 include each of corrected viewport angle prediction sets 611.

Such processing is then repeated for each particular time or download time as discussed with respect to FIG. 5 with prediction models generating predictions for each of a number of future time intervals, the available predictions being ranked for selection using average error descriptors, and the selected predictions being corrected in real time based on the pertinent average error descriptors (i.e., using the average error descriptor corresponding to the model used to generate the prediction). Such techniques improve the time ratio of low quality content in the field of view (e.g., in the context of 360 live streaming immersive video). Thereby, the adaptive prediction model discussed herein improves the user experience in the context of immersive video. Notably, in the context of 1 second future trajectory prediction, the techniques discussed herein correct prediction errors to the point at which different video tile segment selection is made (e.g., reducing error from about 15 to 20 degrees or more to less that 10 degrees), which provides improved quality as the viewer is viewing high quality content (due to accurate prediction) instead of low quality content (when prediction is inaccurate). Furthermore, the prediction model discussed herein is corrected in real time viewing such that it is advantageously personalized to the user providing an improved experience.

Pseudo-code (1) below illustrates the real time adaptive sequential viewport prediction techniques discussed herein:

---
Pseudo-code (1): Adaptive sequential viewport prediction
Algorithm 1: Adaptive sequential viewport prediction ---
Input: required first PTS in segment of prediction
Output: list of predicted angles.
 1:  avg_error_descriptor = GetAVGRecentErrorDescriptor( );
 2:  curr_ranking_list = GetCurrentAccuracyRanking(avg_error_descriptor);
 3:  for all $p_i$ ∈ pts_interval_set do
 4:      for all $r_i$ ∈ ranking_set do  // ranking_set is ordered
 5:          $V_{(p_i,r_i)}$ = GetPredictViewport($p_i$, $r_i$);
 6:          if $V_{(p_i,r_i)}$ is existed then
 7:              $V\_opt_{(p_i,r_i)}$ = CorrectViewport($V_{(p_i,r_i)}$);
 8:              break;
 9:          else then
10:              continue;
11:  Apply viewport priority decision on V_opt
12:  Return V_opt

---

As shown, in Pseudo-code (1), the first PTS (presentation time stamp) in a segment of prediction is provided as an input and the output is a list of predicted angles (e.g., one prediction angle set for each time interval such that each prediction angle set may be used to generate a viewport). As shown, at operation 1, an avg_error_descriptor=GetAVGRecentErrorDescriptor( ) generates and/or retrieves an average error descriptor for each prediction model being employed. At operation 2, a curr_ranking_list=GetCurrentAccuracyRanking(avg_error_descriptor) ranks each available prediction model based on the avg_error_descriptor (with lower error providing a higher ranking). At operation 3, a loop is started such that for each future time interval, a viewport is selected as follows. At operation 4, a loop is started for each top ranked prediction for the particular time interval. At operation 5, the viewport is predicted. At operations 6-10, the viewport is corrected using the corresponding average error descriptor. At operations 11 and 12, the viewport decision is applied and returned for use by the system. For example, in Pseudo-code (1), the real viewport data are collected and prediction units keep running in background process. When timed tile downloading requires prediction FOV, the operations in the algorithm are performed.

Figure 8:
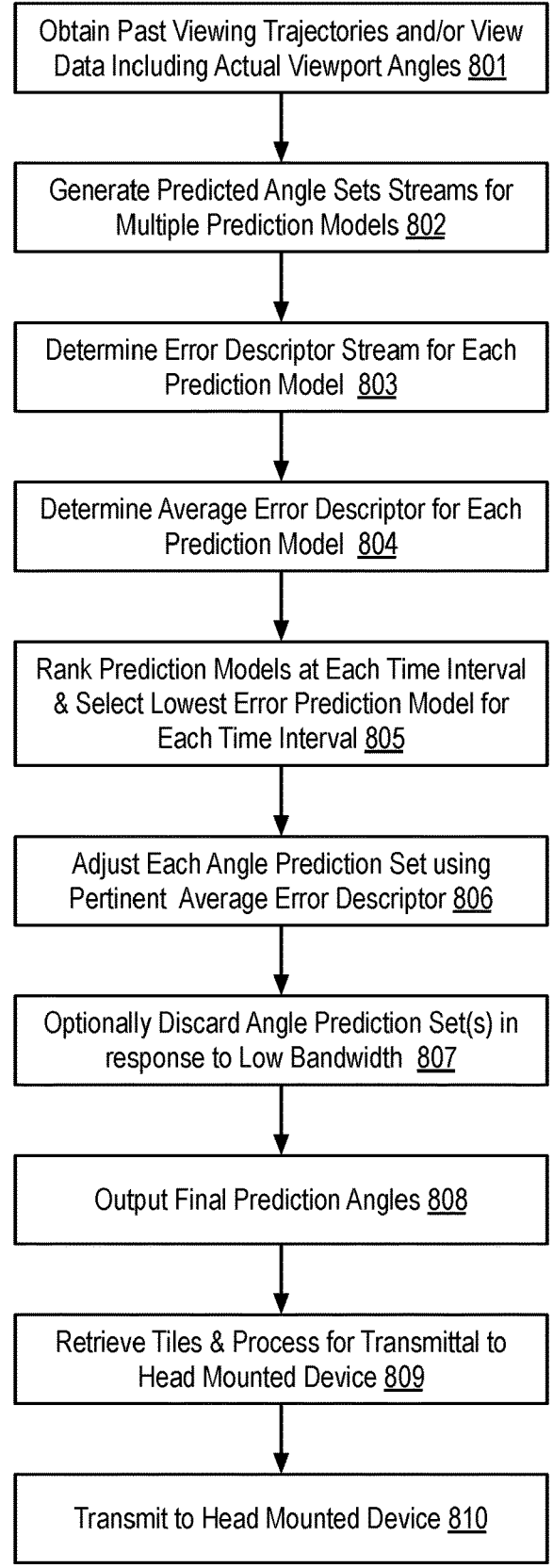
FIG. 8 illustrates an exemplary process 800 for selecting and generating a viewport in immersive video.

FIG. 8 illustrates an exemplary process 800 for selecting and generating a viewport in immersive video, arranged in accordance with at least some implementations of the present disclosure. For example, process 800 may be performed by system 100 to generate an immersive video experience for a user.

Process 800 begins at operation 801, where past viewing trajectories and/or view data including actual viewport angles are attained. For example, such past trajectories provide actual viewing angles of a user of a head mounted display or similar display device. Such actual viewing angles may be compared with predicted angles to generate error descriptors for the prediction models used to generate the predicted angles.

Processing continues at operation 802, where predicted angle sets streams are generated for a number of prediction models. For example, each of multiple prediction models may predict future viewport angles for a particular time interval in the future. For example, not fewer than three prediction models, one each for a first time interval in the future, a second time interval in the future, and a third time interval in the future may be employed with four prediction models being particularly advantageous. Such multiple prediction models may be of the same or different types (e.g., linear regression, CNN, RNN, DNN, etc.) or they may be of the same type but in either case, the multiple prediction models employ different model parameters to predict at different future time intervals.

Processing continues at operation 803, where an error descriptor stream is determined for each of the prediction models. For example, an error descriptor may be generated at each time instance (or some time instances) at which the prediction model made a prediction with the error descriptor being generated based on a comparison of the predicted viewport angles and the actual viewport angles (i.e., as measured and reported by an HMD). In some embodiments, each error descriptor includes a yaw error value including a difference between a predicted yaw value and a measured yaw value, a pitch error value including a difference between a predicted pitch value and a measured pitch value, and an orientation indicative of a direction of a predicted orientation and a measured orientation. However, other error descriptors may be used.

Processing continues at operation 804, where an average error descriptor is determined for each prediction model. In some embodiments, a window of past error descriptor (e.g., the last 100) are averaged to generate an average error descriptor for each prediction model at each time instance. Such average error descriptors may then be used to evaluate the prediction models for a current download time instance.

Processing continues at operation 805, where the prediction models are ranked at each time interval from the current download time instance. For example, from a particular time instance (e.g., T), for each time interval (e.g., T+Δt1, T+Δt2, T+Δt3, T+Δt4, and so on), the available prediction models are ranked and the prediction angle set for the highest ranked prediction model (with lower error ranking higher) is selected at each time interval.

Processing continues at operation 806, where each angle prediction set selected at operation 805, based on the ranking, is adjusted using the pertinent average error descriptor generated at operation 804. For example, the average error descriptor for the selected prediction model is used to adjust the prediction angle set made using the prediction model. For example, correcting a viewport angle prediction set using an error descriptor may include combining a yaw error value of the error descriptor and a yaw value of the particular viewport angle prediction set and a pitch error value of the error descriptor and a pitch value of the particular viewport angle prediction set using an orientation of the error descriptor. For example the yaw/pitch error may be added to or subtracted from predicted yaw/pitch angles based on the orientation defined in the error descriptor.

Processing continues at operation 807, where one or more of the angle prediction sets generated as discussed above may be discarded due to a lack of bandwidth or other system constraint that does not permit processing immersive video at the frequency defined by the future time intervals. In some embodiments, one or more of the corrected viewport angle prediction sets are discarded in response to a current bandwidth being less than a threshold bandwidth value, in response to a system constraint (e.g., processor bandwidth, memory bandwidth) being less than a threshold bandwidth value. In some embodiments, such corrected viewport angle prediction set discarding may be bypassed.

Processing continues at operation 808, where the final prediction angle sets are output for use in retrieving video tiles and/or generating a viewport. For example, the discussed prediction angle sets may be used directly or translated to define high quality tiles corresponding to a view defined by a prediction angle set. Similarly, a prediction angle set may be used to define a viewport when presenting immersive video to a user.

Processing continues at operation 809, where video tiles are retrieved and processed for transmittal to a HMD or similar device. As discussed, each prediction angle sets may be translated to a viewport and to corresponding tiles of video needed to display the viewport. As discussed herein, for the central region of the viewport, high quality video may be retrieved and, for a periphery region low quality video may be retrieved.

Processing continues at operation 810, where the retrieved video tiles are optionally processed via segmenting, parsing, and stitching operations and transmitted to an HMD for decoding, rendering and display to a user. Such operations may be performed using any suitable technique or techniques. Notably, the decode and render operations may be performed by a separate device.

The techniques discussed herein utilize a number of future time intervals each having a correspond viewport prediction model. Given previous viewport streams ($\varphi_{t-tj}$, $\varphi_{t-th+1}$, . . . $\varphi_t$), the predicted angles ($\varphi'_{t+\Delta ti}$) can be determined. An error descriptor is used in an adaptive correction method. An error descriptor is defined as set of error of yaw and pitch and orientation between predicted angles and real angles in the corresponding PTS, which can denote the accuracy of each prediction model (e.g., named P1, P2, P3 and P4). The error descriptor of each model is updated in real time according to the feedback of actual viewport. When a timed downloading occurs at time t+T, prediction data are selected at times t+T+Δti (i=1, 2, 3, 4) in the four models. An average error descriptor is used to rank the models according to accuracy and prediction angles are chosen for the models that rank first at each time interval. The output prediction angles are then corrected using the average error descriptor. Finally, a viewport priority decision model is used to determine the output prediction viewports in the next segment in terms of current bandwidth information.

Figure 9:
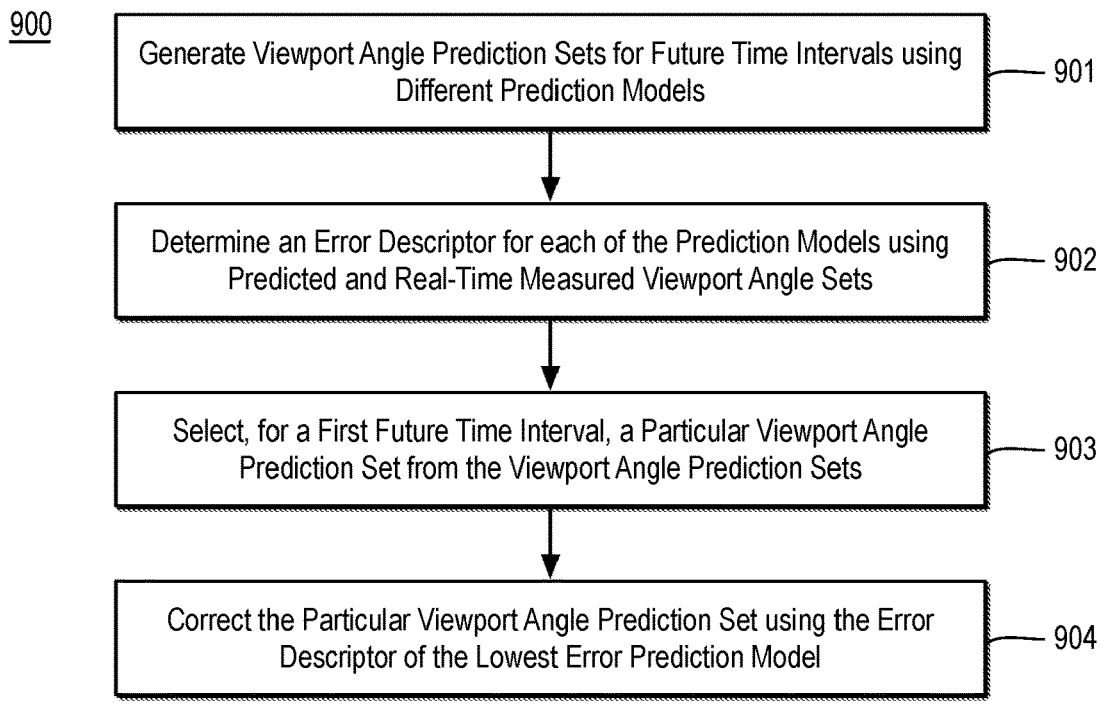
FIG. 9 is a flow diagram illustrating an example process for selecting a viewport in immersive video.

FIG. 9 is a flow diagram illustrating an example process 900 for selecting a viewport in immersive video, arranged in accordance with at least some implementations of the present disclosure. Process 900 may include one or more operations 901-904 as illustrated in FIG. 9. Process 900 may form at least part of a virtual view generation process, a viewport selection process, or the like in the context of immersive video inclusive of 360 video, virtual reality, augmented reality, or the like. By way of non-limiting example, process 900 may form at least part of a process as performed by system 100 as discussed herein. Furthermore, process 900 will be described herein with reference to system 1000 of FIG. 10.

Figure 10:
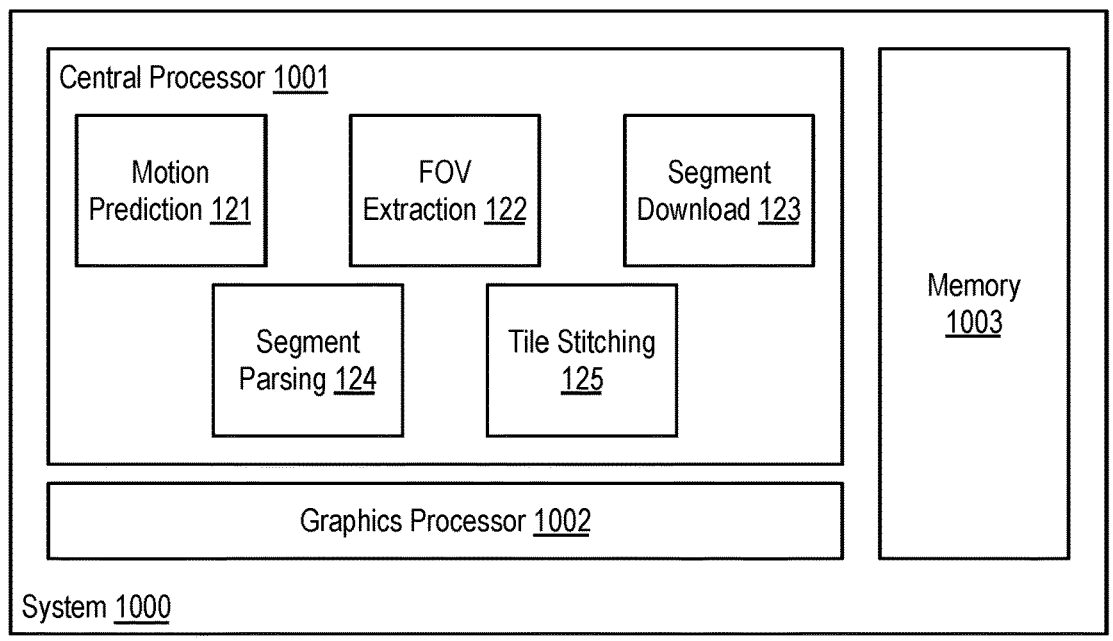
FIG. 10 is an illustrative diagram of an example system for selecting a viewport in immersive video.

FIG. 10 is an illustrative diagram of an example system 1000 for selecting a viewport in immersive video, arranged in accordance with at least some implementations of the present disclosure. As shown in FIG. 10, system 1000 may include a central processor 1001, a graphics processor 1002, and a memory 1003. Also as shown, central processor 1001 may implement motion prediction module 121, field of view extraction module 122, segment download module 123, segment parsing module 124, and tile stitching module 125. In some embodiments, central processor 1001 may also implement motion tracking module 111, rendering module 112, and decoding module 113. In the example of system 1000, memory 1003 may store prediction model parameters, prediction angle sets, error descriptors, average error descriptors, video segments, packet queues, or any other data discussed herein.

As shown, in some examples, one or more or portions of motion prediction module 121, field of view extraction module 122, segment download module 123, segment parsing module 124, and tile stitching module 125 are implemented via central processor 1001. In other examples, one or more or portions of motion prediction module 121, field of view extraction module 122, segment download module 123, segment parsing module 124, and tile stitching module 125 are implemented via graphics processor 1002, an image processing unit, an image processing pipeline, an image signal processor, or the like. In some examples, one or more or portions of motion prediction module 121, field of view extraction module 122, segment download module 123, segment parsing module 124, and tile stitching module 125 are implemented in hardware as a system-on-a-chip (SoC). In some examples, one or more or portions of motion prediction module 121, field of view extraction module 122, segment download module 123, segment parsing module 124, and tile stitching module 125 are implemented in hardware via a FPGA.

Graphics processor 1002 may include any number and type of image or graphics processing units that may provide the operations as discussed herein. Such operations may be implemented via software or hardware or a combination thereof. For example, graphics processor 1002 may include circuitry dedicated to manipulate and/or analyze images obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory. In an embodiment, one or more or portions of motion prediction module 121, field of view extraction module 122, segment download module 123, segment parsing module 124, and tile stitching module 125 are implemented via an execution unit (EU) of graphics processor 1002. The EU may include, for example, programmable logic or circuitry such as a logic core or cores that may provide a wide array of programmable logic functions. In an embodiment, one or more or portions of motion prediction module 121, field of view extraction module 122, segment download module 123, segment parsing module 124, and tile stitching module 125 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 begins at operation 901, where number of viewport angle prediction sets are generated each for a different future time interval from a particular time and each based on a different prediction model. For example, two or more future time intervals may be selected for prediction and a different prediction model may be used for each of the selected time intervals. The viewport angle prediction sets may be generated using any suitable prediction models including linear regression models, CNN models, RNN models, DNN models, or the like. In some embodiments, each prediction model is a linear regression model employing different parameters.

Processing continues at operation 902, where an error descriptor is determined for each of the prediction models using predicted and real-time measured viewport angle sets. In some embodiments, the error descriptor includes a yaw error value including a difference between a predicted yaw value and a measured yaw value, a pitch error value including a difference between a predicted pitch value and a measured pitch value, and an orientation indicative of a direction of a predicted orientation and a measured orientation. For example, the orientation may indicate the direction of the error defined by the magnitudes of the yaw error value and the pitch error value.

Processing continues at operation 903, where, for a first future time interval from the particular time, a particular viewport angle prediction set from the viewport angle prediction sets corresponding to a lowest error prediction model is selected using the error descriptors. In some embodiments, selecting the particular viewport angle prediction set includes generating a historical error value for each of the prediction models based on differences between the predicted viewport angle sets and the real-time measured viewport angle sets. In some embodiments, the historical error value is an average of a number of past differences between the predicted viewport angle sets and the real-time measured viewport angle sets, the real-time measured viewport angle sets received from a head mounted display.

In some embodiments, the prediction models include not fewer than three prediction models, a first prediction model for the first future time interval, a second prediction model for a second future time interval subsequent to the first future time interval, and a third prediction model for a third future time interval subsequent to the second future time interval, and selecting the particular viewport angle prediction set for the first future time interval is based on evaluation of all three prediction models. In some embodiments, process 900 further includes selecting, for the second future time interval, a second particular viewport angle prediction set corresponding to a lowest error prediction model for the second future time interval using the second and third prediction models without use of the first prediction model. In some embodiments, selection of a third particular viewport angle prediction set for the third future time interval is a default selection based only on the third prediction model. In some embodiments, one of the first particular viewport angle prediction set or second particular viewport angle prediction set is discarded in response to a current bandwidth being less than a threshold bandwidth value.

Processing continues at operation 904, where the particular viewport angle prediction set is corrected using the error descriptor of the lowest error prediction model to generate a final viewport angle prediction set for the first future time interval. The particular viewport angle prediction set may be corrected using any suitable technique or techniques. In some embodiments, the error descriptor comprises a yaw error value comprising a difference between a predicted yaw value and a measured yaw value, a pitch error value comprising a difference between a predicted pitch value and a measured pitch value, and an orientation indicative of a direction of a predicted orientation and a measured orientation. In some embodiments, correcting the particular viewport angle prediction set using the error descriptor comprises combining the yaw error value and a yaw value of the particular viewport angle prediction set and the pitch error value and a pitch value of the particular viewport angle prediction set using the orientation. In some embodiments, correcting the particular viewport angle prediction set using the error descriptor comprises combining a yaw error value of the error descriptor and a yaw value of the particular viewport angle prediction set and a pitch error value of the error descriptor and a pitch value of the particular viewport angle prediction set using an orientation of the error descriptor.

Process 900 may be repeated any number of times either in series or in parallel for any number of time instances and/or viewport selection processes. Process 900 may be implemented by any suitable device(s), system(s), apparatus(es), or platform(s) such as those discussed herein. In an embodiment, process 900 is implemented by a system or apparatus having a memory to store a plurality of different prediction models, as well as any other data structures discussed herein, and a processor to perform any of operations 901-904. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
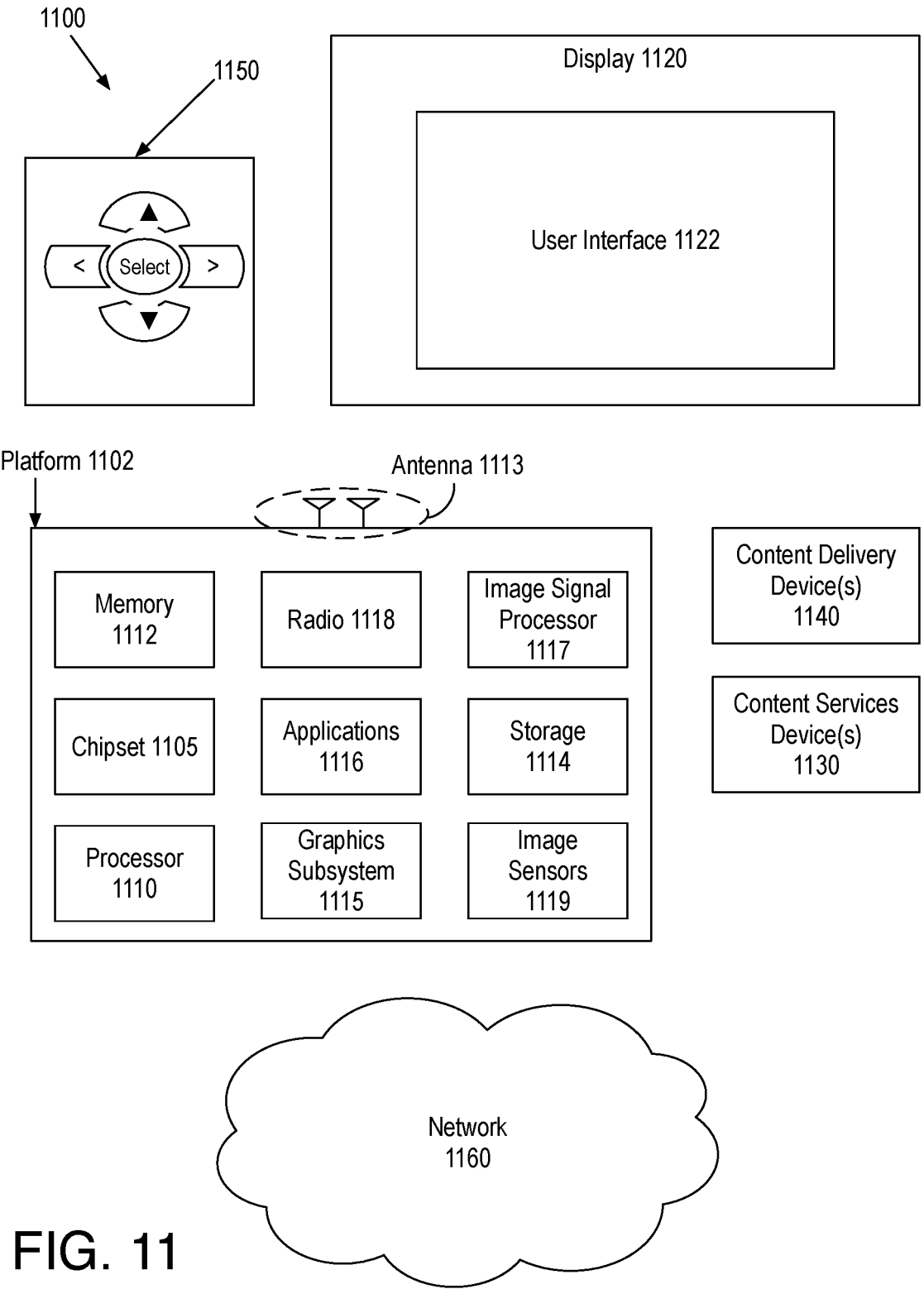
FIG. 11 is an illustrative diagram of an example system.

FIG. 11 is an illustrative diagram of an example system 1100, arranged in accordance with at least some implementations of the present disclosure. In various implementations, system 1100 may be a mobile device system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1100 includes a platform 1102 coupled to a display 1120. Platform 1102 may receive content from a content device such as content services device(s) 1130 or content delivery device(s) 1140 or other content sources such as image sensors 1119. For example, platform 1102 may receive image data as discussed herein from image sensors 1119 or any other content source. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116, image signal processor 1117 and/or radio 1118. Chipset 1105 may provide intercommunication among processor 1110, memory 1112, storage 1114, graphics subsystem 1115, applications 1116, image signal processor 1117 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

Image sensors 1119 may include any suitable image sensors that may provide image data based on a scene. For example, image sensors 1119 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1119 may include any device that may detect information of a scene to generate image data.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
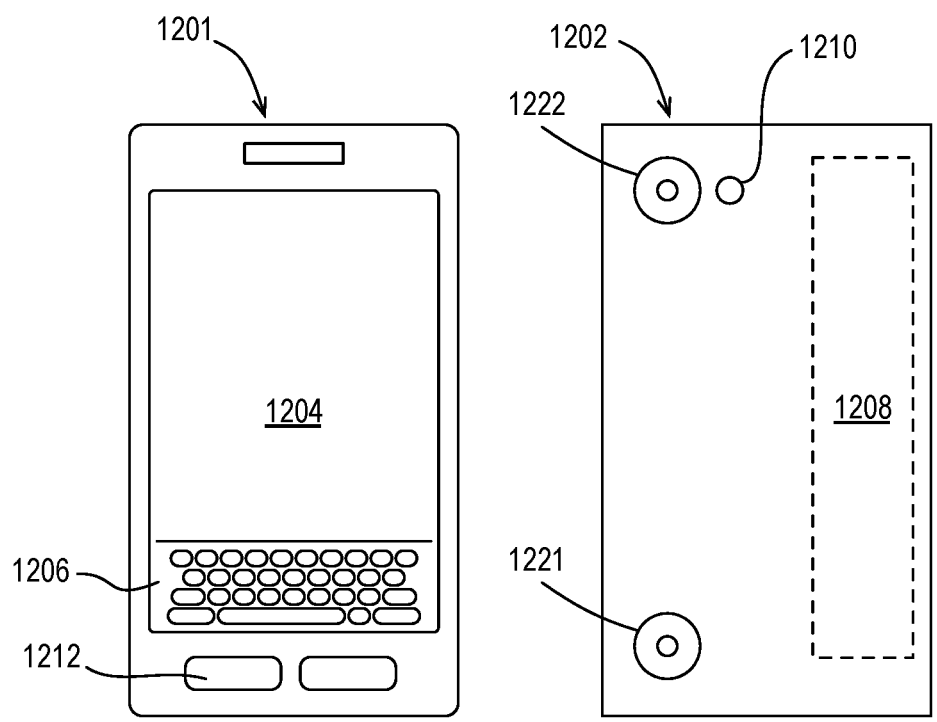
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1200 may be implemented via device 1200. In other examples, other systems, components, or modules discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, a color camera 1221, a color camera 1222, an infrared transmitter 1223, and an integrated antenna 1208. In some embodiments, color camera 1221 and color camera 1222 attain planar images as discussed herein. In some embodiments, device 1200 does not include color camera 1221 and 1222 and device 1200 attains input image data (e.g., any input image data discussed herein) from another device. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include color cameras 1221, 1222, and a flash 1210 integrated into back 1202 (or elsewhere) of device 1200. In other examples, color cameras 1221, 1222, and flash 1210 may be integrated into front 1201 of device 1200 or both front and back sets of cameras may be provided. Color cameras 1221, 1222 and a flash 1210 may be components of a camera module to originate color image data with IR texture correction that may be processed into an image or streaming video that is output to display 1204 and/or communicated remotely from device 1200 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following pertain to further embodiments.

In one or more first embodiments, a method for selecting a viewport comprises generating a plurality of viewport angle prediction sets each for a different future time interval from a particular time and each based on a different prediction model, determining an error descriptor for each of the prediction models using predicted and real-time measured viewport angle sets, selecting, for a first future time interval from the particular time, a particular viewport angle prediction set from the plurality of viewport angle prediction sets corresponding to a lowest error prediction model using the error descriptors, and correcting the particular viewport angle prediction set using the error descriptor of the lowest error prediction model to generate a final viewport angle prediction set for the first future time interval.

In one or more second embodiments, further to the first embodiment, selecting the particular viewport angle prediction set comprises generating a historical error value for each of the prediction models based on differences between the predicted viewport angle sets and the real-time measured viewport angle sets.

In one or more third embodiments, further to the first or second embodiments, the historical error value is an average of a number of past differences between the predicted viewport angle sets and the real-time measured viewport angle sets, the real-time measured viewport angle sets received from a head mounted display.

In one or more fourth embodiments, further to any of the first through third embodiments, the prediction models comprise not fewer than three prediction models, a first prediction model for the first future time interval, a second prediction model for a second future time interval subsequent to the first future time interval, and a third prediction model for a third future time interval subsequent to the second future time interval, and selecting the particular viewport angle prediction set for the first future time interval is based on evaluation of all three prediction models.

In one or more fifth embodiments, further to any of the first through fourth embodiments, the method further comprises selecting, for the second future time interval, a second particular viewport angle prediction set corresponding to a lowest error prediction model for the second future time interval using the second and third prediction models without use of the first prediction model.

In one or more sixth embodiments, further to any of the first through fifth embodiments, selection of a third particular viewport angle prediction set for the third future time interval is a default selection based only on the third prediction model.

In one or more seventh embodiments, further to any of the first through sixth embodiments, one of the first particular viewport angle prediction set or second particular viewport angle prediction set is discarded in response to a current bandwidth being less than a threshold bandwidth value.

In one or more eighth embodiments, further to any of the first through seventh embodiments, the error descriptor comprises a yaw error value comprising a difference between a predicted yaw value and a measured yaw value, a pitch error value comprising a difference between a predicted pitch value and a measured pitch value, and an orientation indicative of a direction of a predicted orientation and a measured orientation.

In one or more ninth embodiments, further to any of the first through eighth embodiments, correcting the particular viewport angle prediction set using the error descriptor comprises combining the yaw error value and a yaw value of the particular viewport angle prediction set and the pitch error value and a pitch value of the particular viewport angle prediction set using the orientation.

In one or more tenth embodiments, further to any of the first through ninth embodiments, the method further comprises selecting one or more video tiles for download from a content provider based on the final viewport angle prediction set.

In one or more eleventh embodiments, a device or system includes a memory and one or more processors to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store at least a portion of a plurality of different prediction models; and
one or more processors coupled to the memory, the one or more processors to:
generate a plurality of viewport angle prediction sets each for a different future time interval from a particular time and each based on one of the different prediction models;
determine an error descriptor for each of the prediction models using predicted and real-time measured viewport angle sets;
select, for a first future time interval from the particular time, a particular viewport angle prediction set from the plurality of viewport angle prediction sets corresponding to a lowest error prediction model using the error descriptors; and
correct the particular viewport angle prediction set using the error descriptor of the lowest error prediction model to generate a final viewport angle prediction set for the first future time interval.

2. The system of claim 1, wherein to select the particular viewport angle prediction set, the one or more processors are to generate a historical error value for each of the prediction models based on differences between the predicted viewport angle sets and the real-time measured viewport angle sets.

3. The system of claim 2, wherein the historical error value is an average of a number of past differences between the predicted viewport angle sets and the real-time measured viewport angle sets, the real-time measured viewport angle sets received from a head mounted display.

4. The system of claim 1, wherein the prediction models include not fewer than three prediction models, a first prediction model for the first future time interval, a second prediction model for a second future time interval subsequent to the first future time interval, and a third prediction model for a third future time interval subsequent to the second future time interval, and the one or more processors are to select the particular viewport angle prediction set for the first future time interval based on evaluation of all three prediction models.

5. The system of claim 4, the one or more processors are to:
select, for the second future time interval, a second particular viewport angle prediction set corresponding to a lowest error prediction model for the second future time interval using the second and third prediction models without use of the first prediction model.

6. The system of claim 5, wherein the one or more processors are to select a third particular viewport angle prediction set for the third future time interval based only on the third prediction model.

7. The system of claim 5, wherein one of the particular viewport angle prediction set or the second particular viewport angle prediction set is discarded in response to a current bandwidth being less than a threshold bandwidth value.

8. The system of claim 1, wherein the error descriptor includes a yaw error value comprising a difference between a predicted yaw value and a measured yaw value, a pitch error value including a difference between a predicted pitch value and a measured pitch value, and an orientation indicative of a direction of a predicted orientation and a measured orientation.

9. The system of claim 1, wherein to correct the particular viewport angle prediction set using the error descriptor, the one or more processors are to combine a yaw error value of the error descriptor and a yaw value of the particular viewport angle prediction set and a pitch error value of the error descriptor and a pitch value of the particular viewport angle prediction set based on an orientation of the error descriptor.

10. The system of claim 1, the one or more processors are to:
select one or more video tiles for download from a content provider based on the final viewport angle prediction set.

11. A method comprising:
generating a plurality of viewport angle prediction sets each for a different future time interval from a particular time and each based on a different prediction model;
determining an error descriptor for each of the prediction models using predicted and real-time measured viewport angle sets;
selecting, for a first future time interval from the particular time, a particular viewport angle prediction set from the plurality of viewport angle prediction sets corresponding to a lowest error prediction model using the error descriptors; and
correcting the particular viewport angle prediction set using the error descriptor of the lowest error prediction model to generate a final viewport angle prediction set for the first future time interval.

12. The method of claim 11, wherein the selecting of the particular viewport angle prediction set includes generating a historical error value for each of the prediction models based on differences between the predicted viewport angle sets and the real-time measured viewport angle sets.

13. The method of claim 11, wherein the prediction models include not fewer than three prediction models, a first prediction model for the first future time interval, a second prediction model for a second future time interval subsequent to the first future time interval, and a third prediction model for a third future time interval subsequent to the second future time interval, and selecting the particular viewport angle prediction set for the first future time interval is based on evaluation of all three prediction models.

14. The method of claim 13, further including:
selecting, for the second future time interval, a second particular viewport angle prediction set corresponding to a lowest error prediction model for the second future time interval using the second and third prediction models without use of the first prediction model.

15. The method of claim 11, wherein the correcting the particular viewport angle prediction set using the error descriptor includes combining a yaw error value of the error descriptor and a yaw value of the particular viewport angle prediction set and a pitch error value of the error descriptor and a pitch value of the particular viewport angle prediction set using an orientation of the error descriptor.

16. At least one machine readable medium comprising a plurality of instructions that, in response to being executed on a computing device, cause the computing device to at least:
generate a plurality of viewport angle prediction sets each for a different future time interval from a particular time and each based on a different prediction model;
determine an error descriptor for each of the prediction models using predicted and real-time measured viewport angle sets;
select, for a first future time interval from the particular time, a particular viewport angle prediction set from the plurality of viewport angle prediction sets corresponding to a lowest error prediction model using the error descriptors; and
correct the particular viewport angle prediction set using the error descriptor of the lowest error prediction model to generate a final viewport angle prediction set for the first future time interval.

17. The machine readable medium of claim 16, wherein to select the particular viewport angle prediction set, the instructions cause the computing device to generate a historical error value for each of the prediction models based on differences between the predicted viewport angle sets and the real-time measured viewport angle sets.

18. The machine readable medium of claim 16, wherein the prediction models include not fewer than three prediction models, a first prediction model for the first future time interval, a second prediction model for a second future time interval subsequent to the first future time interval, and a third prediction model for a third future time interval subsequent to the second future time interval, and selection of the particular viewport angle prediction set for the first future time interval is based on evaluation of all three prediction models.

19. The machine readable medium of claim 18, wherein the instructions, in response to being executed on the computing device, are to cause the computing device to:
select, for the second future time interval, a second particular viewport angle prediction set corresponding to a lowest error prediction model for the second future time interval using the second and third prediction models without use of the first prediction model.

20. The machine readable medium of claim 16, wherein to correct the particular viewport angle prediction set using the error descriptor, the instructions are to cause the computing device to combine a yaw error value of the error descriptor and a yaw value of the particular viewport angle prediction set and a pitch error value of the error descriptor and a pitch value of the particular viewport angle prediction set using an orientation of the error descriptor.

* * * * *

UNITED STATES PATENT AND TRADEMARK OFFICE
CERTIFICATE OF CORRECTION

| | | |
|---|---|---|
| PATENT NO. | : 12,418,634 B2 | Page 1 of 1 |
| APPLICATION NO. | : 18/275596 | |
| DATED | : September 16, 2025 | |
| INVENTOR(S) | : Luo et al. | |

It is certified that error appears in the above-identified patent and that said Letters Patent is hereby corrected as shown below:

In the Claims

Column 27, Line 12 (Claim 15), replace "correcting the" with -- correcting of the --

Signed and Sealed this
Twenty-third Day of December, 2025

John A. Squires
*Director of the United States Patent and Trademark Office*